(12) United States Patent
Balasubramanian et al.

(10) Patent No.: US 9,507,898 B2
(45) Date of Patent: Nov. 29, 2016

(54) IDENTIFICATION OF MISTIMED FORCING OF VALUES IN DESIGN SIMULATION

(71) Applicant: GLOBALFOUNDRIES INC., Grand Cayman (KY)

(72) Inventors: Santosh Balasubramanian, Karnataka (IN); Aaron C. Brown, Austin, TX (US); David W. Cummings, Round Rock, TX (US); Ambalath Matayambath Roopesh, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 318 days.

(21) Appl. No.: 14/099,459

(22) Filed: Dec. 6, 2013

(65) Prior Publication Data

US 2014/0095141 A1 Apr. 3, 2014

Related U.S. Application Data

(63) Continuation of application No. 13/492,399, filed on Jun. 8, 2012, now abandoned.

(51) Int. Cl.
*G06F 17/50* (2006.01)

(52) U.S. Cl.
CPC ....... *G06F 17/5045* (2013.01); *G06F 17/5022* (2013.01); *G06F 17/5031* (2013.01); *G06F 2217/84* (2013.01)

(58) Field of Classification Search
CPC ........... G06F 17/5045; G06F 17/5022; G06F 17/5031; G06F 17/5059; G06F 2217/84
USPC .................. 703/14, 19, 16, 15, 13
See application file for complete search history.

(56) References Cited

U.S. PATENT DOCUMENTS

| | | | |
|---|---|---|---|
| 5,220,512 A | 6/1993 | Watkins et al. | |
| 7,434,193 B2 | 10/2008 | Hunt et al. | |
| 7,437,282 B2 | 10/2008 | Musselman | |
| 8,332,201 B1* | 12/2012 | Briggs | G06F 17/5045 703/15 |
| 8,566,767 B1 | 10/2013 | Kukal et al. | |
| 2002/0123874 A1 | 9/2002 | Roesner et al. | |
| 2003/0125921 A1 | 7/2003 | Yamamoto | |
| 2006/0195822 A1 | 8/2006 | Beardslee et al. | |

(Continued)

OTHER PUBLICATIONS

Arekapudi, Srikanth et al., "ATPG for Timing-Induced Functional Errors on Trigger Events in Hardware-Software Systems", 2002, Proceedings of the Seventh IEEE European Test Workshop, IEEE.*

(Continued)

*Primary Examiner* — Cedric D Johnson
(74) *Attorney, Agent, or Firm* — Scully Scott Murphy and Presser

(57) ABSTRACT

A computer identifies a storage element in a simulation model of an integrated circuit design that, during simulation of the integrated circuit design using the simulation model, is subject to having its value forced. In response to identifying the storage element, an indication of the storage element and the associated clock signal are stored in a database. In response to receiving an input indicating the value of the storage element is to be forced during simulation, a determination is made by reference to the database whether or not forcing of the value is mistimed with reference to the associated clock signal. In response to a determination that the forcing of the value as indicated by the input is mistimed with reference to the associated clock signal, an indication that forcing of the value is mistimed is output.

9 Claims, 4 Drawing Sheets

(56) References Cited

U.S. PATENT DOCUMENTS

2008/0294413 A1 11/2008 Bobok et al.
2009/0293031 A1* 11/2009 Darsow ............... G06F 17/5031
 716/113

OTHER PUBLICATIONS

Hartl, Robert et al., "Improved Backwards Analysis for Architectural Vulnerability Factor Estimation", Sep. 27-28, 2011, Semiconductor Conference Dresden, IEEE.*
Metra, Cecilia et al., "On-Line Testing Scheme for Clock's Faults", 1997, International Test Conference, Paper 24.3, IEEE.*
Aghababa, Hossein et al., "A High Speed and Power Controlled CMOS Edge Detector for 2.5 Gb/s Clock Recovery Circuit", May 22-24, 2006, International Conference on Microwaves, Radar & Wireless Communications, IEEE.*
Ghaffari, A. et al., "A New Lock-Detect Circuit for Self Correcting DLLs", Sep. 6-8, 2006, 3rd International Conference on Electrical and Electronics Engineering, IEEE.*
Omana, Martin et al., "Fast and Low-Cost Clock Deskew Buffer", 2004, Proceedings of the 19th IEEE International Symposium on Defect and Fault Tolerance in VLSI Systems, IEEE.*
Monaco et al., "Functional Verification Methodology for the PowerPC 604TM Microprocessor", Somerset Design Center, 33rd Design Automation Conference, AMC 1996 (6 pg) http://www.cecs. uci.edu/~papers/compendium94-03/papers/1996/dac96/pdffiles/23_4.pdf.
D. Tavangarian, "VHDL-Based Simulation of Electronic Circuits and Systems", Journal Systems Analysis Modelling Simulation archive, vol. 18-19, pp. 61-72, 1995.
U.S. Appl. No. 13/492,399 entitled "Identification of Mistimed Forcing of Values in Design Simulation"; Non-Final Office Action dated Mar. 12, 2015 (16 pg).
Arekapudi Srikanth et al., "ATPG for Timing-Induced Functional Errors on Trigger Events in Hardware-Software Systems"; Proceedings of the Seventh IEEE European Test Workshop, IEEE. 2002 (6 pg).
Hartl, Robert et al., "Improved Backwards Analysis for Architectural Vulnerability Factor Estimation", Sep. 27-28, 2011, Semiconductor Conference Dresden (SCD), IEEE. (pp. 1-4).
Zhang, Qiushuang et al., "A Validation Fault for Timing-Induced Functional Errors", 2001, ITC International Test Conference, IEEE pp. 813-820.
Soukup et al., "Implementation of a Fiber-Optic Delay-Line Memory", Jun. 10, 1002, Applied Optics, vol. 31, No. 17, Optical Society of America.
Floros et al., "The Time Dilation Scan Architecture for Timing Error Detection and Correction", Oct. 2008, IFIP/IEEE International Conference on Very Large Scale Integration (VLSI-SoC).
Office Action dated Sep. 22, 2015, received in a related U.S. Appl. No. 13/492,399.

* cited by examiner

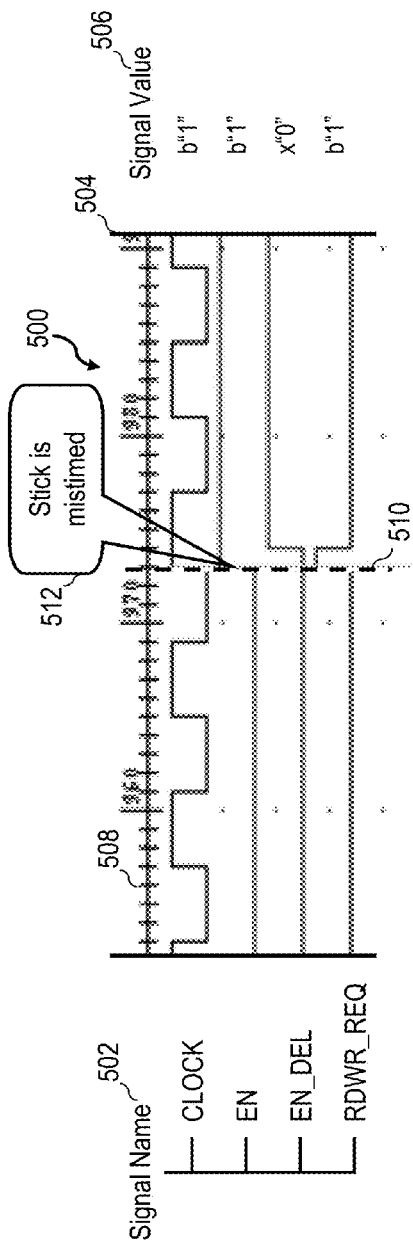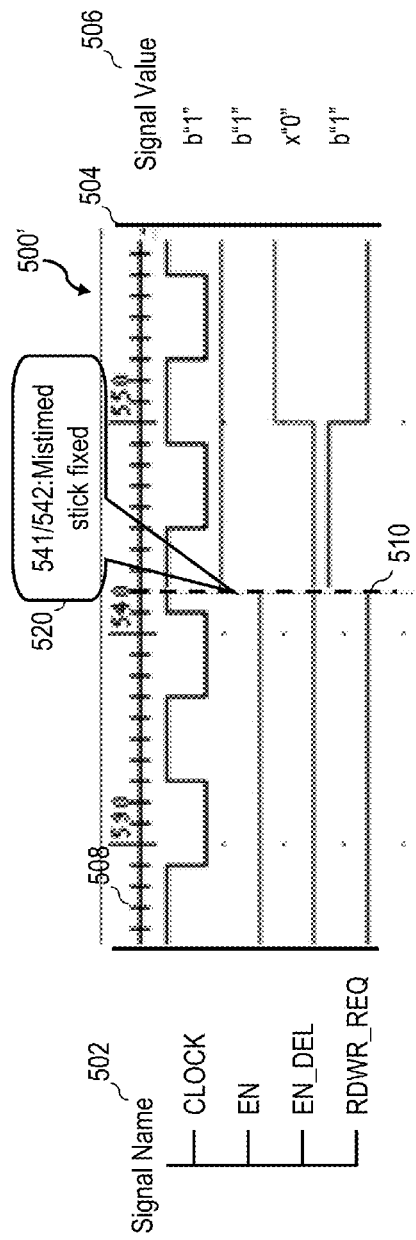
Figure 5
Figure 6

IDENTIFICATION OF MISTIMED FORCING OF VALUES IN DESIGN SIMULATION

PRIORITY CLAIM

This application is a continuation of U.S. patent application Ser. No. 13/492,399, entitled "IDENTIFICATION OF MISTIMED FORCING OF VALUES IN DESIGN SIMULATION," filed on Jun. 8, 2012, the disclosure of which is incorporated herein by reference in its entirety for all purposes.

BACKGROUND OF THE INVENTION

The present invention relates to data processing, and more specifically, to identification of mistimed forcing of values in the simulation of a design.

Designers typically employ a high level language, such as a hardware description language (HDL), to define the structure and function of a design, such as a design of an integrated circuit. The design files specified in the high level language are then compiled to obtain a simulation model of the design, which is stimulated by a simulation engine with one or more testcases (i.e., a sequence of inputs and associated expected signal values in the design) in order to verify aspects of the design.

Various types of simulation can be utilized to verify designs. Logic or functional simulation, which is often the first type of simulation performed, verifies the logical correctness of the design without regard to timing constraints. Event simulation, which tracks signal changes in the design as events, additionally supports verification in the presence of simple timing information such as signal delays. Cycle simulation, which employs a cycle-accurate model of the design, does not support specification of delays, but instead evaluates every gate in the design every simulation cycle and enables significant performance improvement over event simulation in cases in which, on the whole, signal levels change relatively infrequently.

In functional simulation, forcing a signal in the design to a particular value (commonly referred to "sticking" a signal) is commonly utilized to verify the logical correctness of the design or to determine the response of the design to various combinations of signal values. Because functional simulation is not bound by timing constraints, the practice of forcing signal values does not create any issues as long as the signal value (or combination of signal values) forced on the design is legal. In event simulation and cycle simulation, however, forcing a signal in the design to a particular value can induce an error in the simulation results if the forced signal value is applied at the wrong time relative to other signals in the design, such as clock signals. For example, in the case of flip flops, the output values change at a rising or falling clock edge in event simulators and one simulation cycle after the clock transition in cycle simulators. If the signal value is forced at any other time, the forced change in signal value may cause an unrealistic and therefore erroneous response in the simulation model. Such errors in the simulation results can be difficult to detect.

BRIEF SUMMARY

In some embodiments, a computer identifies a storage element in a simulation model of an integrated circuit design that, during simulation of the integrated circuit design using the simulation model, is subject to having its value forced. In response to identifying the storage element, an indication of the storage element and the associated clock signal are stored in a database. In response to receiving an input indicating the value of the storage element is to be forced during simulation, a determination is made by reference to the database whether or not forcing of the value is mistimed with reference to the associated clock signal. In response to a determination that the forcing of the value as indicated by the input is mistimed with reference to the associated clock signal, an indication that forcing of the value is mistimed is output.

BRIEF DESCRIPTION OF THE SEVERAL VIEWS OF THE DRAWINGS

FIG. 5 is a first exemplary embodiment of a presentation of simulation results generated by a simulator; and FIG. 6 is a second exemplary embodiment of a presentation of simulation results generated by a simulator.

DETAILED DESCRIPTION

Figure 1:
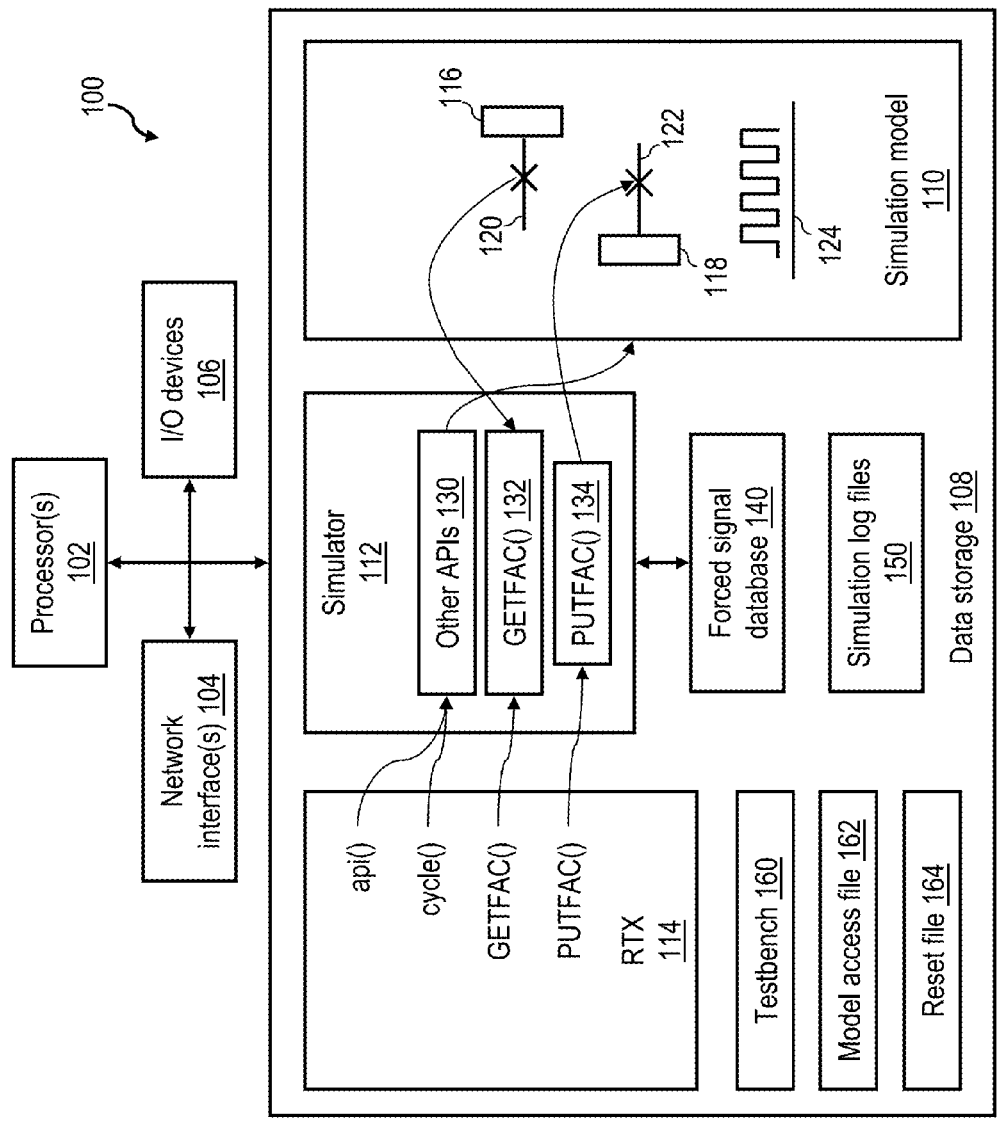
FIG. 1 is a high level block diagram of a data processing system in accordance with one embodiment.

With reference now to the figures and with particular reference to FIG. 1, there is illustrated a high level block diagram of an exemplary embodiment of a data processing system 100. In the illustrated exemplary embodiment, data processing system 100 includes one or more processors 102 that process data and program code, for example, to simulate a design, such as an integrated circuit design. Data processing system 100 additionally includes one or more network interfaces 104 through which data processing system 100 can communicate with one or more other computing resources (e.g., other processing, storage or communication resources) via cabling and/or one or more wired or wireless, public or private, local or wide area networks (including the Internet). Data processing system 100 also includes input/output (I/O) devices 106, such as ports, display devices, and attached devices, etc., which receive inputs and provide outputs of the processing performed by data processing system 100 and/or other computing resource(s) coupled to data processing system 100. Finally, data processing system 100 includes data storage 108, which may include one or more volatile or non-volatile storage devices, including memories, solid state drives, optical or magnetic disk drives, tape drives, portable storage media, etc.

In the illustrated embodiment, data storage 108 stores, in addition to unillustrated operating system software (e.g., Windows, Unix, AIX, LINUX, etc.), various program code and data processed by processors 102 to simulate a design. As shown, data storage 108 includes a simulation model 110, which is a logical representation of the design to be simulated, such as an integrated circuit design. Simulation model 110 include constructs modeling a plurality of unillustrated combinatorial logic elements, a plurality of storage elements 116, 118 (e.g., latches and/or registers), and a plurality of signals 120, 122 and 124 in the design. Signals 120 and 122 are output by storage elements 116 and 118, respectively, and signal 124 is a clock signal that synchronizes operation of the combinatorial logic elements and/or one or more of storage elements 116, 118.

Data storage 108 additionally stores software including a simulator 112 and, optionally, a separate RTX (Run Time eXecutive) 114. Simulator 112, which can be, for example, a cycle simulator or event simulator, loads one or more simulation models, such as simulation model 110, into data storage 108. Simulator 112 additionally simulates the design by stimulating simulation model 110 with one or more testcases from testbench 160, where the application of a testcase to simulation model 110 is commonly referred to as a "simulation run." During one or more simulation runs, simulator 112 resets simulation model 110 to various initial states based on reset information contained in reset file 164 and clocks and evaluates simulation model 110 via various APIs (Application Programming Interfaces) 130-134. For example, simulator 112 reads values from simulation model 110 utilizing GETFAC API 132 and writes values to simulation model 110 utilizing PUTFAC API 134 based on information contained in model access (or FAC) file 162. As illustrated in FIG. 1, the values simulator 112 reads from and writes to simulation model 110 are commonly specified in a model access file 162 in terms of specific signals (e.g., the values of signals 120, 122), but can alternatively or additionally be expressed in terms of the storage elements (e.g., storage elements 116, 118) that output the signals. The values of the signals and/or storage elements in simulation model 110 at various cycles (for a cycle simulator) or at occurrence of various events (for an event simulator) during a simulation run are stored for subsequent viewing and analysis as simulation log files 150. Although simulator 112 is depicted in FIG. 1 as implemented in software, it should be appreciated that in alternative embodiments simulator 112 is implemented at least partially in hardware.

RTX 114 is an optional control program that, if implemented, controls simulation of simulation models, such as simulation model 110, by simulator 112. For example, RTX 114 can specify to simulator 112 which testcases from testbench 160 are to be applied to simulation model 110. In addition, RTX 114 can be utilized to deliver API calls to the APIs 130-134 provided by simulator 112 to initialize, configure, and exercise simulation model 110, for example, by applying values to simulation model 110 or by advancing to the next cycle (in a cycle simulator).

Figure 2:
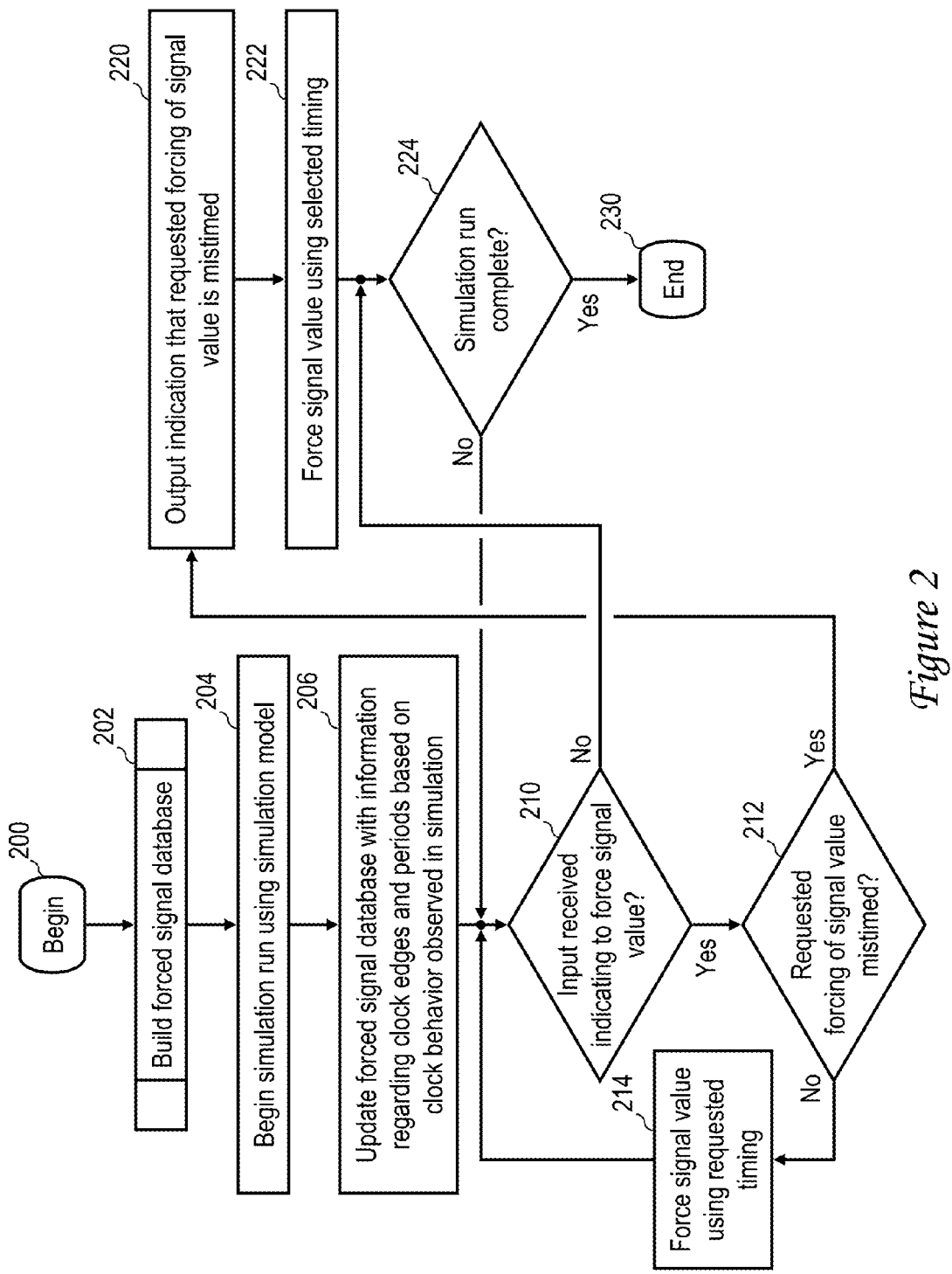
FIG. 2 is a high level logical flowchart of an exemplary embodiment of a process for identifying mistimed forcing of a signal value in simulation of a design.

Referring now to FIG. 2, there is depicted a high level logical flowchart of an exemplary embodiment of a process for identifying mistimed forcing of a value in a simulation model. The process begins at block 200 and then proceeds to block 202, which illustrates simulator 112 building a forced signal database 140 (see, FIG. 1) that specifies the signals (e.g., signals 120, 122) and/or storage elements (e.g., storage elements 116, 118) that have their values forced during a simulation run and preferably additionally indicates the associated clock signal(s) (e.g., clock signal 124) utilize to drive those storage elements.

Figures 3, 4:
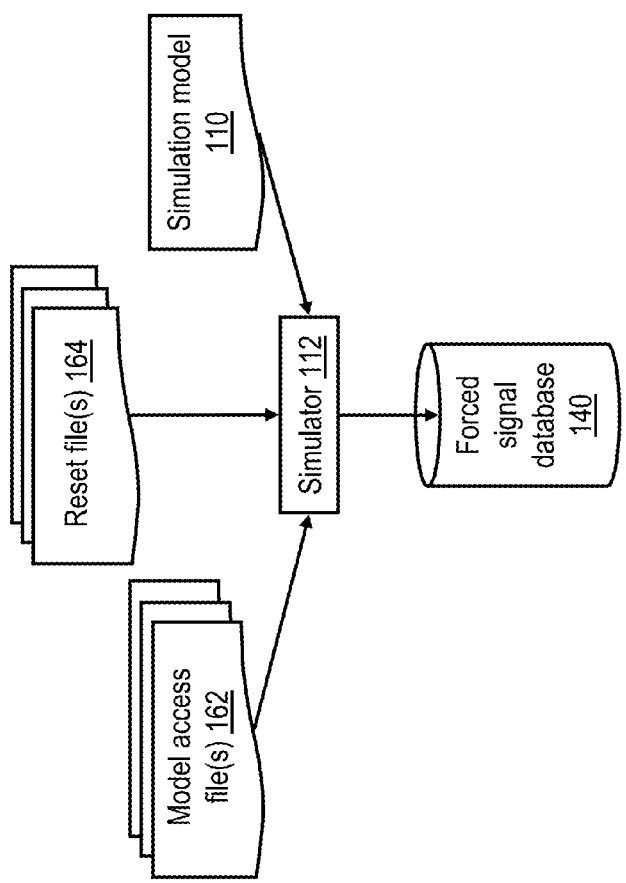
FIG. 3 is a data flow diagram illustrating an exemplary embodiment of a process for building a forced signal database.
FIG. 4 depicts an exemplary embodiment of an entry in the forced signal database.

FIG. 3 illustrates one exemplary embodiment of a process for building forced signal database 140. As illustrated in FIG. 3, prior to a simulation run, simulator 112 receives as inputs one or more model access files 162, one or more reset files 164 and a simulation model 110 to be utilized in the simulation run. Simulator 112 first identifies which signals are to be forced during simulation by calls to PUTFAC API 124 (and/or other APIs 130) in accordance with the contents of model access file(s) 162 and reset file(s) 163. By reference to simulation model 110, simulator 112 performs signal traceback to identify the storage elements (e.g., storage elements 116, 118) that output the identified signal values. In addition, simulator 112 determines the clock signal(s) utilized to drive the identified storage elements, for example, by reference to clock signals explicitly specified in model access file 162 or by analysis of simulation model 110. Simulator 112 records the forced signals, the storage elements that output the forced signals, and the associated clock signals determined by the process of FIG. 3 in forced signal database 140.

FIG. 4 depicts an exemplary embodiment of an entry 400 in the forced signal database 140 generated according to the process given in FIG. 3. Entry 400 includes a testcase field 402 that specifies the testcase within testbench 160 with which entry 400 is associated. In addition, entry 400 includes a signal name field 404 that specifies a signal name of a signal forced during the testcase, a latch name field 406 that specifies the latch name of the storage element that outputs the forced signal, a clock name field 408 that specifies the clock name of the clock signal that drives the specified storage element, and a clock data field 410. Clock data field 410 is dynamically updated during simulation with information regarding the specified clock signal, as described further below.

Returning to block 204 of FIG. 2, after the entries 400 in forced signal database 140 relevant to a particular testcase in testbench 160 are generated, simulator 112 begins a cycle-based or event-based simulation run by stimulating simulation model 110 with the particular testcase. As noted above, simulator 112 can either direct the simulation run itself or can alternatively be controlled through RTX 114.

After the clock signals in simulation model 110 (e.g., clock signal 124) are stable, simulator 112 updates clock data fields 410 of the relevant entries 400 in forced signal database 140 with the information about the edges of the clock signals and the periods of the clock signals (block 206). If a clock signal is subject to jitter or if the clock signal is non-periodic, simulator 112 additionally monitors the clock signal to determine the pattern of the jitter during initial cycles (assuming the jitter is periodic) and updates the relevant clock data field 410 with the jitter information. If the jitter has no identifiable pattern (the jitter is random), simulator 112 determines the edge of the clock for each simulation cycle.

At block 210, simulator 112 monitors for receipt of an input indicating that a signal value in simulation model 110 is to be forced to a specified value. The input can be, for example, a call to PUTFAC API 134. If simulator 112 does not detect receipt of an input indicating that a signal value in simulation model 110 is to be forced, simulator 112 additionally determines at block 224 whether or not the simulation run is complete. If so, the process shown in FIG. 2 terminates at block 230. If, however, the simulation run is not complete, simulator 112 continues simulating the design, and the process given in FIG. 2 returns to block 210, which has been described.

In response to simulator 112 detecting at block 210 an input indicating that signal value in simulation model 110 is to be forced, simulator 112 determines by reference to forced signal database 140 whether or not forcing of the signal value is mistimed with respect to the associated clock signal (block 212). For example, simulator 112 performs a lookup in forced signal database 130 and accesses the appropriate entry 400 by performing a match on the contents of testcase field 402 and signal name field 404 or latch name field 406. Simulator 112 can then determine the next active edge of the associated clock signal by reference to clock data field 410 and consequently determine whether the requested alteration of the signal value (i.e., the value in the associated storage element) is mistimed.

In response to a negative determination at block 212, simulator 112 forces ("sticks") the signal to the specified value at the requested time in the simulation (block 214), for example, by forcing the associated storage element to the specified value via PUTFAC API 134. Thereafter, simulator 112 continues the simulation run, and the process returns to block 210, which has been described. In response to a determination at block 212 that the requested forcing of the signal value is mistimed with respect to an associated clock signal, the process proceeds from block 212 to block 220.

Block 220 illustrates simulator 112 outputting an indication that the requested forcing of the signal value is mistimed with respect to an associated clock signal. In various embodiments, the indication output by simulator 112 can be output in a variety or combination of forms, including in a dialog box requesting user confirmation of when to apply the "stick" (e.g., mistimed as requested or correctly timed), in a notification message that a mistimed "stick" was automatically detected and corrected, in an error message in a dynamic presentation of simulation results on a display, in a notation on a signal value trace in one of simulation log files 150 indicating the correct timing for forcing the signal value, etc. Simulator 112 additionally forces the signal to the specified signal value using a selected timing (block 222). In some embodiments, simulator 112 automatically applies the correct timing to the signal "stick" and merely notifies the user of the alteration in timing. Simulator 112 can determine when to alter the latch value, for example, based on the delay from clock to data output of the latch specified in a Standard Delay Format (SDF) file. In other embodiments, simulator 112 has a default configuration setting that, if employed, causes simulator 112 to force the signal to the specified signal value using appropriate timing with respect to the associated clock signal, but explicitly provides the user with opportunity to override the default configuration by confirming application of a mistimed signal "stick." In other embodiments, simulator 112 forces the signal to the specified signal value in a mistimed manner as requested and merely provides notification of the mistiming via the presentation of the simulation results and/or simulation log files 150. Other variations or combinations of options are additionally contemplated.

Following block 222, simulator 112 determines at block 224 whether or not the simulation run is complete. If so, the process given in FIG. 2 terminates at block 230. If, however, the simulation run is not complete, the process given in FIG. 2 returns from block 224 to block 210, which has been described.

With reference now to FIG. 5, there is illustrated is a first exemplary embodiment of a presentation 500 of simulation results generated by simulator 112. Presentation 500 may be presented by simulator 112, for example, via a display device among I/O devices 106 or coupled to data processing system 100 by one of I/O devices 106. In the embodiment depicted in FIG. 5, simulator 112 is a cycle simulator configured to present simulation results of a simulation run in substantially real time during the simulation run and/or after the simulation run completes (e.g., from simulation log files 150). In the illustrated embodiment, simulator 112 is further configured, either by default or by user configuration, to provide notification of mistimed sticks without altering the timing of the sticks.

Presentation 500 includes three components (which can optionally be implemented in separate windows or panes of a graphical user interface), including a signal tree 502, a signal waveform graph 504, and a signal value summary 506. Signal tree 502 illustrates that in the depicted example simulation model 110 includes at least four signals, respectively identified by the signal names CLOCK, EN (enable), EN_DEL (delayed enable), and RDWR_REQ (read/write request). Signal waveform graph 504, which presents the values of the signals in signal tree 502 with reference to a timeline 508 of simulation cycles, indicates that CLOCK is a fifty percent duty cycle clock signal having a period of eight simulation cycles, and that EN_DEL is a delayed version of EN that is generated by simulation model 110 one simulation cycle after the next rising edge of CLOCK at or after a rising edge of EN. The values of the signals at a user-selectable time index 510 are summarized in signal value summary 506.

As further indicated in FIG. 5, during simulation, simulator 110 forces EN to the value b"1" coincident with the rising edge of CLOCK at simulation cycle 973, for example, in response to a call to PUTFAC API 134 specified in model access file 162. In response to the change in value of EN, simulated circuitry within simulation model 110 generates EN_DEL one simulation cycle later at simulation cycle 974. As a result, the pulse generated by simulation model 110 on RDWR_REQ is a glitch lasting for only a single simulation cycle. Because this glitch response does not correspond to hardware behavior, simulator 110 presents a notification 512 in conjunction with signal waveform graph 504 to inform the user that simulator 112 has detected, but not corrected, a mistimed forcing of EN at simulation cycle 973, as described above with reference to block 220 of FIG. 2.

Referring now to FIG. 6, there is a depicted a second exemplary embodiment of a presentation 500' of simulation results generated by simulator 112. Presentation 500', like presentation 500 of FIG. 5, may be presented by simulator 112 via a display device during the simulation run (i.e., using substantially real time simulation results) and/or after the simulation run completes (e.g., from simulation results recorded in simulation log files 150). In the second embodiment, simulator 112 is further configured, either by default or by user configuration, to provide notification of mistimed sticks and, if possible, to alter the timing of the sticks to better reflect the operation of the design as realized in integrated circuitry.

During the simulation scenario depicted in FIG. 6, simulator 110 receives an input (e.g., a call to PUTFAC API 134) requesting EN to be forced to the value b"1" coincident with the rising edge of CLOCK at simulation cycle 541. As described above with reference to block 212 of FIG. 2, simulator 110 determines that the forcing of the value of EN is mistimed with respect to CLOCK, and accordingly applies the "stick" (automatically or in response to user confirmation) one cycle later at simulation cycle 542. Accordingly, simulation model 110 generates EN_DEL eight simulation cycles (i.e., a full CLOCK cycle) later at simulation cycle 550. As a result, the pulse generated by simulation model 110 on RDWR_REQ has the proper length (e.g., a full CLOCK cycle) corresponding to expected hardware behavior. Simulator 110 further presents a notification 520 in conjunction with signal waveform graph 504 to inform the user that simulator 112 has detected a mistimed forcing of EN at simulation cycle 541 and corrected the timing at which EN is forced at simulation cycle 542.

As has been described, in some embodiments, a computer identifies a storage element in a simulation model of an integrated circuit design that, during simulation of the integrated circuit design using the simulation model, is subject to having its value forced. In response to identifying the storage element, an indication of the storage element and the associated clock signal are stored in a database. In response to receiving an input indicating the value of the storage element is to be forced during cycle-based or event-based simulation, a determination is made by reference to the database whether or not forcing of the value is mistimed with reference to the associated clock signal. In response to a determination that the forcing of the value as indicated by the input is mistimed with reference to the associated clock signal, an indication that forcing of the value is mistimed is output. The user is thus notified about unrealistic alteration of values in the simulation model. In some embodiments, the simulator automatically modifies timing of application of the particular value to the storage element so that forcing of the value is not mistimed.

While the present invention has been particularly shown as described with reference to one or more preferred embodiments, it will be understood by those skilled in the art that various changes in form and detail may be made therein without departing from the spirit and scope of the invention. For example, although aspects have been described with respect to a computer system executing program code that directs the functions of the present invention, it should be understood that present invention may alternatively or additionally be implemented as a program product including a computer-readable storage medium or device storing program code that can be processed by a data processing system. As utilized herein, the terms "computer-readable storage medium" and "computer-readable storage device" are defined to exclude signals per se and to include only those embodiments of machines, manufactures, and improvements thereof that are statutory under 35 U.S.C. §101. A computer-readable storage medium or device can include, without limitation, a volatile or non-volatile memory, a magnetic or optical storage device, a CD-ROM.

What is claimed is:

1. A method of data processing, comprising:
   prior to a simulation of an integrated circuit design using a simulation model running on a computer:
   the computer identifying a storage element for storing a logic value in the simulation model of an integrated circuit design that, during simulation of the integrated circuit design using the simulation model, is subject to having its logic value forced, wherein the storage element has an associated clock signal providing a timing reference for updates to the logic value held in the storage element;
   in response to identifying the storage element, recording in a database an indication of the storage element and an identification of the associated clock signal including a clock edge and a period of the associated clock signal, the associated clock signal period being a number of simulation cycles; and
   during simulation of the integrated circuit design using the simulation model running on the computer:
   in response to receiving an input indicating the logic value of the storage element is to be forced, determining by reference to the database, an active edge of the associated clock signal, and determining whether or not forcing of the logic value is mistimed with reference to the active edge of the associated clock signal; and
   in response to a determination that the forcing of the logic value as indicated by the input is mistimed with reference to the active edge of the associated clock signal, automatically modifying the timing of forcing of the logic value of the storage element for a number of simulation cycles with respect to the active edge of the associated clock signal so that forcing of the logic value is not mistimed, and outputting an indication that forcing of the logic value is mistimed.

2. The method of claim 1, wherein the identifying includes identifying the storage element from a simulation file specifying one or more logic values to be asserted during simulation.

3. The method of claim 1, wherein the storage element is one of a set including a latch and a register.

4. The method of claim 1, wherein the recording includes recording a name of the storage element and a name of the clock signal.

5. The method of claim 1, wherein the outputting comprises outputting an indication of a timing relative to the clock signal at which the logic value is to be forced.

6. The method of claim 1, and further comprising simulating the integrated circuit design utilizing one of a set including event simulation and cycle simulation.

7. The method of claim 1, wherein the automatically modifying the timing for the number of simulation cycles so the forcing of the logic value at the storage element is not mistimed comprises: forcing the logic value after the clock-to-data delay of the storage element specified by the simulation model.

8. The method of claim 1, further comprising: dynamically updating, at the computer, the database during the simulation to record the active edge of the associated clock signal and jitter information for the associated clock signal.

9. The method of claim 1, wherein the timing as modified retains a logic delay applied by the simulation model to an output of the storage element.

* * * * *